(12) United States Patent
Guo et al.

(10) Patent No.: US 9,793,970 B2
(45) Date of Patent: Oct. 17, 2017

(54) METHOD AND DEVICE FOR CONFIGURING CHANNEL STATE INFORMATION FEEDBACK, METHOD AND DEVICE FOR MEASUREMENT AND FEEDBACK

(71) Applicant: ZTE Corporation, Shenzhen, Guangdong (CN)

(72) Inventors: Senbao Guo, Shenzhen (CN); Yunfeng Sun, Shenzhen (CN); Yu Ngok Li, Shenzhen (CN); Junfeng Zhang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 268 days.

(21) Appl. No.: 14/404,990

(22) PCT Filed: Jul. 11, 2013

(86) PCT No.: PCT/CN2013/079254
§ 371 (c)(1),
(2) Date: Dec. 2, 2014

(87) PCT Pub. No.: WO2014/019445
PCT Pub. Date: Feb. 6, 2014

(65) Prior Publication Data
US 2015/0131563 A1 May 14, 2015

(30) Foreign Application Priority Data
Jul. 31, 2012 (CN) .......................... 2012 1 0271360

(51) Int. Cl.
*H04B 7/06* (2006.01)
*H04W 24/10* (2009.01)
(Continued)

(52) U.S. Cl.
CPC ............. *H04B 7/0626* (2013.01); *H04B 7/04* (2013.01); *H04L 5/0053* (2013.01); *H04L 25/0224* (2013.01); *H04W 24/10* (2013.01)

(58) Field of Classification Search
CPC ... H04L 1/0027; H04L 1/0026; H04L 5/0057; H04L 5/0053; H04L 5/0091; H04L 5/001;
(Continued)

(56) References Cited

U.S. PATENT DOCUMENTS

2012/0140649 A1* 6/2012 Choudhury ........... H04W 24/10
370/252
2012/0140708 A1* 6/2012 Choudhury ......... H04W 72/082
370/328
(Continued)

FOREIGN PATENT DOCUMENTS

| CN | 101867457 A | 10/2010 |
|---|---|---|
| CN | 102368697 A | 3/2012 |
| WO | 2012077480 A1 | 6/2012 |

OTHER PUBLICATIONS

RI and PMI sharing between multiple CSI processes May 30, 2012.
(Continued)

*Primary Examiner* — Jung-Jen Liu
(74) *Attorney, Agent, or Firm* — Oppedahl Patent Law Firm LLC

(57) ABSTRACT

Disclosed is a method for configuring a channel state information (CSI) feedback. The method comprises: configuring multiple sets of CIS processes for a terminal, where each CSI process comprises at least information on a channel measurement part and information on an interference measurement, where the information on the channel measurement part comprises one or multiple sets of nonzero power CSI reference signal configuration or indication information, and where the information on the interference measurement part comprises at least one type of information
(Continued)

among the following: one or multiple sets of interference measurement resource configuration information or indication information, one or multiple sets of nonzero power CSI reference signal configuration information for use in interference measurement compensation. Also disclosed are a method for measurement and feedback based on the method, and a corresponding device for implementing the method. The present invention implements unified configuration and reception of the CSI feedback for a base station-side and a terminal-side, and is capable of flexibly implementing CSI configuration and feedback.

15 Claims, 6 Drawing Sheets

(51) Int. Cl.
*H04B 7/04* (2017.01)
*H04L 25/02* (2006.01)
*H04L 5/00* (2006.01)

(58) Field of Classification Search
CPC . H04W 72/10; H04W 72/0413; H04W 24/10; H04W 72/0453; H04W 72/085
See application file for complete search history.

(56) References Cited

U.S. PATENT DOCUMENTS

2013/0148533 A1* 6/2013 Li ..................... H04L 25/0202
370/252
2013/0258954 A1* 10/2013 Khoshnevis .......... H04L 1/0026
370/329

OTHER PUBLICATIONS

International Search Report in international application No. PCT/CN2013/079254, mailed on Oct. 24, 2013.
English Translation of the Written Opinion of the International Search Authority in international application No. PCT/CN2013/079254, mailed on Oct. 24, 2013.

* cited by examiner

METHOD AND DEVICE FOR CONFIGURING CHANNEL STATE INFORMATION FEEDBACK, METHOD AND DEVICE FOR MEASUREMENT AND FEEDBACK

TECHNICAL FIELD

The disclosure relates to Channel State Information (CSI) feedback technology, and in particular to a method and device for configuring CSI feedback, a measuring method based on CSI feedback configuring information, and a method and device for feeding back CSI.

BACKGROUND

Following versions R8/9/10, R11 technology is further proposed for a Long Term Evolution (LTE) system. Some R8 products become commercially available gradually. Further product planning is required for R9 and R10.

Added with R10 on the basis of R8 and R9 are many new features, such as a pilot feature like a Demodulation Reference Signal (DMRS) and a Channel State Information Reference Signal (CSI-RS), as well as a transmission and feedback feature such as 8-antenna supporting. In particular, with enhanced Inter-Cell Interference Cancelling (eICIC) technology, inter-point interference avoidance is further considered on the basis of R8/9 ICIC. In a solution for inter-point interference in an initial stage of R10, mainly considered is point interference avoidance in a homogeneous network, with a mainstream being eICIC and Coordinated Multi-point (CoMP) technology. By name, with CoMP, multiple nodes are coordinated to send data to one or more UEs using the same or different time-frequency resources, which may reduce inter-point interference, increase point-edge throughput, and expand point coverage. In later discussion more scenarios introduced by a heterogeneous network are considered. Due to complexity of CoMP and limited time for R10 discussion, it is decided in the end to introduce no more CoMP standardization in R10. Rather, a CoMP demand may be taken into account in CSI-RS design. Therefore, CoMP is not discussed any further after the 60 bis conference.

In an initial Study Item of R11 discussion, unified assessment architecture is determined mainly via CoMP transmission technology and scenario planning. It is proved by two-stage CoMP assessment that a notable performance gain may be obtained with CoMP. A recent CoMP SI concludes that further study has to be done on Joint Transmission (JT), Dynamic Point Selection (DPS), Coordinated Scheduling (CS), Coordinated Beamforming (CB) in CoMP.

Before the study, one has to first ponder a difference in CoMP with R8/9/10, including that in measuring and reporting multi-node Channel State Information (CSI) by a UE, meeting different demands of CoMP transmission technology, and CoMP measuring set notification by CoMP control signaling. A solution for multi-node CSI measuring and reporting by a UE via CoMP is of a top priority. According to discussion at present, CoMP feedback mainly may include periodic feedback and aperiodic feedback, as well as aggregated CSI feedback and non-aggregated CSI feedback. With the so-called aggregated CSI feedback, CSI of multiple nodes is aggregated into that of one node for global feedback. For example, a measuring set contains two nodes, CSI of a node 1 being H1, and CSI of a node 2 being H2. A UE aggregates channels of both nodes into a greater set of CSI H=[H1; H2] before performing measurement-related computation and feedback. Mon-aggregated CSI feedback may further include separate single-point feedback and separate single-point feedback plus inter-point correction information. With the so-called separate single-point feedback, measurement-related computation and feedback is performed separately in accordance with CSI of each node. With the so-called separate single-point feedback plus inter-point correction information, measurement-related computation is performed separately in accordance with CSI of each node, and inter-node phase and/or amplitude information is computed before feedback is performed. Aggregated CSI includes feedback of an aggregated Channel Quality Indicator (CQI). An aggregated CQI fed back by a UE side is measured according to one or more sets of CSI-RS configuring information. The UE may find a time-frequency location corresponding to a CSI-RS using multiple sets of CSI-RS configuring information, perform measurement to obtain precoding weight information, and perform computation using interference information obtained by another pilot. Here, the UE is supposed to receive data sent by nodes corresponding to one or more sets of CSI-RS configuring information to obtain CQI in joint sending performed by the nodes. An aggregated CQI may correspond to aggregated measurement according to one or more sets of CSI-RS configuring information. For example, a measuring set may contain 3 sets of CSI-RS configuring information, in which case there are a total of 7 choices, 3 in aggregation of one set of CSI-RS configuring information, 3 in aggregation of two sets of CSI-RS configuring information, and 1 in aggregation of one set of CSI-RS configuring information. Therefore, there are many choices instead of one for aggregated CQI.

As a conventional R8/R9/R10 user only has to feed back serving point CSI, for both periodic feedback and aperiodic feedback, only single-point capacity has to be considered on the same carrier. In particular, it is enough to have single-point feedback optimized for a Physical Uplink Control Channel (PUCCH). At present, given coding and a number of Hybrid Adaptive Request Retransmission (HARQ) bits, a UE supports at most 11-bit CSI feedback in a PUCCH uplink subframe. The 11 bits may consist at most of a 4-bit Precoding Matrix Indicator (PMI) and 7-bit CQI of two codewords (given inter-codeword differential CQI feedback). With CoMP, multi-point CSI feedback has to be taken into account, which requires N*11-bit PUCCH capacity, which goes beyond current PUCCH capacity. Therefore, there has to be a sound feedback solution for inadequate PUCCH capacity. One may easily come up with feedback signaling compression. However, high CSI accuracy may be required for CoMP, especially for JT and even for JT-MU. Performance loss due to compression may lead to a lowered CoMP performance gain. Another consideration may be to increase PUCCH capacity by re-designing a PUCCH feedback format, which sure requires more standardization efforts. Given that requirement for CSI feedback differ with different CoMP modes and that adaptive switching between different modes may have to be ensured, such feedback design may get even more complicated. Therefore, it is discussed to introduce inter-node information that may ensure flexible coordinated transmission mode switching and/or introduce the concept of an aggregated CQI. it is discussed in a recent conference that similar performance may be obtained by an aggregated CQI and by inter-node information+aggregated CQI, in which case no comparison is made for introducing additional inter-node information feedback. The discussion over whether to introduce inter-node information feedback continues at the conference. However, with either solution introducing the concept of an aggregated CQI is considered. The concept is to feed back CQI produced by multi-node aggregation. A combination of an arbitrary number of nodes of all nodes in a measuring set may be aggregated. For example, for a measuring set containing six nodes, there are 63 possible combinations. Given an upper limit to the number of aggregated nodes, there may be 41 possible combinations. In case that a UE feeds back multiple aggregated CQIs of various cases once or by multiple subframes, an agreement has to be reached between a base station side and the UE side before the base station side can learn to receive the aggregated CQI feedback and learn the nodes in the combination fed back by the UE.

For R10 the feedback mainly may include periodic feedback and aperiodic feedback.

Aperiodic feedback has to be triggered by uplink authorization or random access authorization control signaling. Table 1 shows aperiodic feedback modes.

TABLE 1

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

An aperiodic reporting mode is configured to the terminal side by higher-layer signaling cqi-ReportModeAperiodic.

A Rank Indicator RI has to be fed back only when a base station side configures a terminal side to adopt transmission modes 3, 4, 8 and 9 with a PMI/RI feedback configuration. For a wideband feedback mode 1-2, a terminal side has to feed back multiple subband PMIs and a wideband CQI computed based on the multiple subband PMIs. A the mode 3-0 and a the mode 3-1 are for a higher-layer configured subband CQI. For the mode 3-0 a terminal side has to feed back a wideband CQI and multiple subband CQIs, both the wideband CQI and the subband CQIs being computed based on a codeword. For a transmission mode 3, different RIs have to be taken into account in CQI computation. For a transmission mode other than the mode 3, RI=1 is assumed in CQI computation. For a mode 3-1, a terminal side has to feed back a wideband PMI, and then compute and feed back a wideband CQI and multiple subband CQIs respectively according to the wideband PMI fed back. For transmission modes 4, 8, and 9, the CQI computation has to be based on the value of the RI, while for other transmission modes, CQI computation is based on RI=1. Subband CQI feedback for the mode 3-0 and the mode 3-1 is performed differentially. Modes 2-0 and 2-2 are for UE selected subband feedback. For the mode 2-0, a terminal side has to feed back a CQI for M preferred subbands and a wideband CQI. For transmission mode 3, different RIs have to be taken into account in CQI computation, while for a transmission mode other than the mode 3, RI=1 is assumed in CQI computation. For the mode 2-2, a terminal side has to feed back a PMI for M preferred subbands and a wideband PMI in addition to a CQI for M preferred subbands (computed based on a PMI for M preferred subbands) and a wideband CQI (computed based on a wideband PMI).

Periodic feedback is configured by a higher layer semi-statically, and may include modes as shown in Table 2.

TABLE 2

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For a transmission mode 9 and a terminal configured with 8 CSI-RS antenna ports, a mode 1-1 may include a sub-mode 1 and a sub-mode 2, configured via higher-layer signaling PUCCH_format_1-1_CSI_reporting_mode.

Different feedback periods and subframe biased feedback entities may be distinguished via periodic feedback types as follows.

Type 1 feedback reports a UE selected subband CQI.
Type 1a feedback includes a subband CQI and a second PMI.
Type 2, Type 2b and Type 2c feed back a wideband CQI and a PMI.
Type 2a feedback reports wideband PMI feedback.
Type 3 feedback reports an RI.
Type 4 feedback reports a wideband CQI.
Type 5 feedback reports an RI and a wideband PMI.
Type 6 feedback reports an RI and a PTI.

Wideband feedback includes a mode 1-0 and a mode 1-1. The mode 1-1 may further include a sub-mode 1 and a sub-mode 2. For the mode 1-0, a terminal side in transmission mode 3 feeds back a Type3 RI and a Type4 wideband CQI. For the mode 1-1, a Type3 RI and a wideband PMI and a wideband CQI of Type2 are fed back in a transmission mode other than the transmission mode 9 with 8 CSI-RS ports configured. For the sub-mode 1 of the mode 1-1 in the transmission mode 9 with 8 CSI-RS ports configured, a terminal side feeds back joint coding of the first wideband PMI and an RI of Type5 and joint coding of the second wideband PMI and a wideband CQI of Type2b. For the sub-mode 2 of the mode 1-1 in the transmission mode 9 with 8 CSI-RS ports configured, a terminal side feeds back joint coding of the second wideband PMI, the first wideband PMI and a wideband CQI of Type2c and a Type3 RI. A mode 2-0 and a mode 2-1 are for a UE selected subband CQI. For the mode 2-0, a terminal side in transmission mode 3 reports a Type3 RI, a Type4 wideband CQI and a Type1 intra-bandwidth subband CQI. For the transmission mode 2-1, in a transmission mode other than the transmission mode 9 with 8 CSI-RS ports configured, a Type1 intra-bandwidth subband CQI and joint coding of a PMI and a wideband CQI of Type2 and a Type3 RI may be fed back. For the mode 2-1 in the transmission mode 9 with 8 CSI-RS ports configured, joint coding of an RI and a PTI of Type6 is fed back, and then a way of feedback may further be selected according to the PTI. When PTI=0, a first wideband PMI of Type2a and then joint coding of the second wideband PMI and a wideband CQI of Type2b are fed back. When PTI=1, joint coding of the second wideband PMI and a wideband CQI of Type2b, and then joint coding of the second subband PMI and a subband CQI of 1a may be fed back.

Given that for R11 CoMP, a UE has to feed back CSI of multiple CSI-RS resources, the UE should feed back multiple sets of CSI in accordance with a certain feedback rule, regarding which, on one hand uplink feedback overheads have to be minimized, on the other hand feedback has to be performed in a way as simple and unified as possible, so as to reduce probability of a possible conflict in feedback information. However, at present, a CSI feedback rule is still in discussion, and no reference is provided by related art.

SUMMARY

In view of this, it is desired that embodiments of the disclosure provides a method and device for configuring CSI feedback, a measuring method based on CSI feedback configuring information, and a method and device for feeding back CSI, capable of implementing flexible CSI configuration and feedback.

To this end, a technical solution of the disclosure is implemented as follows.

A method for configuring Channel State Information (CSI) feedback, includes:

configuring, for a terminal, multiple CSI processes each including at least channel measuring information and interference measuring information.

The channel measuring information includes one or more sets of nonzero-power (NZP) CSI Reference Signal (CSI-RS) configuring or indicating information.

The interference measuring information includes at least one of:

one or more sets of interference measurement resource (IMR) configuring information or IMR indicating information; and one or more sets of interference measurement compensating NZP CSI-RS configuring information.

The multiple CSI processes may include at least one item of:

a configured number N of reported processes supported; and process report configuring information.

The process report configuring information may include at least one item of:

a set of NZP CSI-RS configuring information for reporting a process n; and at least one of a set of IMR configuring information for reporting the process n and a set of interference measurement compensating NZP CSI-RS configuring information or interference measurement compensating NZP CSI-RS indicating information for reporting the process n.

Both the n and the N may be natural numbers, with n≤N, n being a process index.

The multiple CSI processes may include process report configuring information.

The process report configuring information may include at least one item of:

a set of NZP CSI-RS configuring information for reporting a process n; and at least one of a set of IMR configuring information for reporting the process n and a set of interference measurement compensating NZP CSI-RS configuring information or interference measurement compensating NZP CSI-RS indicating information for reporting the process n.

Both the n and the N may be natural numbers, with n≤N, n being a process index.

The interference measurement compensating NZP CSI-RS indicating information may be the index information or the bitmap information indicating one of multiple sets of interference measurement compensating NZP CSI-RS configuring information preconfigured.

The method may further include:

configuring, for the terminal, information for configuring or indicating one or more NZP CSI-RSs for channel measurement, IMRs and/or interference measurement compensating NZP CSI-RSs.

The method may further include:

indicating, with index information or bitmap information, channel measuring information and interference measuring information of each of one or more CSI processes configured. The channel measuring information of the each of one or more CSI processes configured may consist of information for configuring a NZP CSI-RS. The interference measuring information of the each of one or more CSI processes configured may consist of a set of IMR configuring information and a set of interference measurement compensating NZP CSI-RS configuring information, or consist of a set of IMR configuring information.

The one or more NZP CSI-RSs for channel measurement may consist of one or more NZP CSI-RSs.

The one or more IMRs may consist of one or more zero-power (ZP) CSI-RSs.

The information for configuring the one or more interference measurement compensating NZP CSI-RSs may consist of information for configuring one or more NZP CSI-RSs in the channel measuring information.

The indicating, with the index information, the channel measuring information and the interference measuring information of the each of one or more CSI processes configured may include:

indicating channel measuring information and interference measuring information of a CSI process with M bits, of which M1 bits may be for the channel measuring information indicating one of the configured one or more NZP CSI-RSs for channel measurement, and M2 bits for the interference measuring information indicating one of the configured one or more IMRs for interference measurement, the M1, the M2, and the M all being natural numbers, with M1+M2=M.

The indicating, with the index information, the channel measuring information and the interference measuring information of the each of one or more CSI processes configured may include:

indicating channel measuring information and interference measuring information of a CSI process with M bits, of which M1 bits may be for the channel measuring information indicating one of the configured one or more NZP CSI-RSs for channel measurement, M2 bits for the interference measuring information indicating one of the configured one or more IMRs for interference measurement, and M3 bits for the interference measuring information indicating one of the configured one or more interference measurement compensating NZP CSI-RSs for interference measurement compensation, the M1, the M2, the M3, and the M all being natural numbers, with M1+M2+M3=M.

The indicating, with the index information, the channel measuring information and the interference measuring information of the each of one or more CSI processes configured may include:

indicating channel measuring information and interference measuring information of a CSI process with M bits, of which M1 bits may be for the channel measuring information indicating one of the configured one or more NZP CSI-RSs for channel measurement, and M2 bits for the interference measuring information indicating, with joint coding, one of the configured one or more IMRs for interference measurement and indicating one of the configured one or more interference measurement compensating NZP CSI-RSs for interference measurement compensation, the M1, the M2, and the M all being natural numbers, with M1+M2=M.

The indicating, with the index information, the channel measuring information and the interference measuring information of the each of one or more CSI processes configured may include:

indicating the channel measuring information with 2 bits, indicating IMR information in the interference measuring information with 4 bits, and indicating interference measurement compensating information in the interference measuring information with 2 bits;

or, indicating the channel measuring information with 2 bits, indicating IMR information in the interference measuring information with 3 bits, and indicating interference measurement compensating information in the interference measuring information with 2 bits;

or, indicating the channel measuring information with 2 bits, indicating IMR information in the interference measuring information with 2 bits, and indicating interference measurement compensating information in the interference measuring information with 2 bits;

or, indicating the channel measuring information with 2 bits, indicating IMR information in the interference measuring information with 1 bit, and indicating interference measurement compensating information in the interference measuring information with 1 bit;

or, indicating the channel measuring information with 2 bits, and indicating, with joint coding, IMR information and interference measurement compensating information in the interference measuring information with 2 bits.

The method may further include:
indicating, with bitmap information, one or more CSI processes fed back by the terminal.

The method may further include:
forming P CSI processes with one or more sets of channel measuring information and one or more sets of interference measuring information, and notifying, via a P-bit bitmap, the terminal to feed back Q of the P CSI processes. The Q may be a number of bits with a value of 1 in the P-bit bitmap or a number of bits with a value of 0 in the P-bit bitmap, both the P and the Q being natural numbers.

The method may further include: configuring, for each set of NZP channel measuring reference signal configuring information, information for configuring or indicating one or more IMRs and/or interference measurement compensating NZP RSs.

The one or more IMRs may consist of one or more zero-power (ZP) CSI-RSs.

A measuring method based on Channel State Information (CSI) feedback configuring information, includes:
acquiring, by a terminal, multiple CSI processes configured, and performing measurement in accordance with the multiple CSI processes. Each of the multiple CSI processes may include at least channel measuring information and interference measuring information. The channel measuring information may include one or more sets of nonzero-power (NZP) CSI Reference Signal (CSI-RS) configuring or indicating information.

The interference measuring information may include at least one of:
one or more sets of interference measurement resource (IMR) configuring information or IMR indicating information; and
one or more sets of interference measurement compensating NZP CSI-RS configuring information.

The multiple CSI processes may include at least one item of:
a configured number N of reported processes supported; and
process report configuring information.

The process report configuring information may include at least one item of:

a set of NZP CSI-RS configuring information for reporting a process n; and
at least one of a set of IMR configuring information for reporting the process n and a set of interference measurement compensating NZP CSI-RS configuring information or interference measurement compensating NZP CSI-RS indicating information for reporting the process n.

Both the n and the N may be natural numbers, with n≤N, n being a process index.

The multiple CSI processes may include
process report configuring information.

The process report configuring information may include at least one item of:
a set of NZP CSI-RS configuring information for reporting a process n; and
at least one of a set of IMR configuring information for reporting the process n and a set of interference measurement compensating NZP CSI-RS configuring information or interference measurement compensating NZP CSI-RS indicating information for reporting the process n.

Both the n and the N are natural numbers, with n≤N, n being a process index.

The method may further include:
acquiring, by the terminal, configured information for configuring or indicating one or more NZP CSI-RSs for channel measurement, multiple IMRs and/or multiple interference measurement compensating NZP CSI-RSs.

The method may further include:
acquiring, by the terminal, index information or bitmap information indicating channel measuring information and interference measuring information of each of one or more CSI processes. The channel measuring information of the each of one or more CSI processes configured may consist of information for configuring a NZP CSI-RS. The interference measuring information of the each of one or more CSI processes configured may consist of a set of IMR configuring information and a set of interference measurement compensating NZP CSI-RS configuring information, or consist of a set of IMR configuring information.

The one or more NZP CSI-RSs for channel measurement may consist of one or more NZP CSI-RSs.

The one or more IMRs may consist of one or more zero-power (ZP) CSI-RSs.

The information for configuring the one or more interference measurement compensating NZP CSI-RSs may consist of information for configuring one or more NZP CSI-RSs in the channel measuring information.

The index information may indicate channel measuring information and interference measuring information of a CSI process with M bits, of which M1 bits may be for the channel measuring information indicating one of the configured one or more NZP CSI-RSs for channel measurement, and M2 bits for the interference measuring information indicating one of the configured one or more IMRs for interference measurement, the M1, the M2, and the M all being natural numbers, with M1+M2=M.

The index information may indicate channel measuring information and interference measuring information of a CSI process with M bits, of which M1 bits may be for the channel measuring information indicating one of the configured one or more NZP CSI-RSs for channel measurement, M2 bits for the interference measuring information indicating one of the configured one or more IMRs for interference measurement, and M3 bits for the interference measuring information indicating one of the configured one or more interference measurement compensating NZP CSI-RSs for interference measurement compensation, the M1, the M2, the M3, and the M all being natural numbers, with M1+M2+M3=M.

The index information may indicate channel measuring information and interference measuring information of a CSI process with M bits, of which M1 bits may be for the channel measuring information indicating one of the configured one or more NZP CSI-RSs for channel measurement, and M2 bits for the interference measuring information indicating, with joint coding, one of the configured one or more IMRs for interference measurement and indicating one of the configured one or more interference measurement compensating NZP CSI-RSs for interference measurement compensation, the M1, the M2, and the M all being natural numbers, with M1+M2=M.

The index information may be configured for: indicating the channel measuring information with 2 bits, indicating IMR information in the interference measuring information with 4 bits, and indicating interference measurement compensating information in the interference measuring information with 2 bits;

or, indicating the channel measuring information with 2 bits, indicating IMR information in the interference measuring information with 3 bits, and indicating interference measurement compensating information in the interference measuring information with 2 bits;

or, indicating the channel measuring information with 2 bits, indicating IMR information in the interference measuring information with 2 bits, and indicating interference measurement compensating information in the interference measuring information with 2 bits;

or, indicating the channel measuring information with 2 bits, indicating IMR information in the interference measuring information with 1 bit, and indicating interference measurement compensating information in the interference measuring information with 1 bit;

or, indicating the channel measuring information with 2 bits, and indicating, with joint coding, IMR information and interference measurement compensating information in the interference measuring information with 2 bits.

P CSI processes may be formed with one or more sets of channel measuring information and one or more sets of interference measuring information. The terminal may be notified, via a P-bit bitmap, to feed back Q of the P CSI processes. The Q may be a number of bits with a value of 1 in the P-bit bitmap or a number of bits with a value of 0 in the P-bit bitmap, both the P and the Q being natural numbers.

A method for feeding back Channel State Information (CSI), includes:

when there is a conflict in Rank Indicators (RIs) of multiple CSI processes fed back by a terminal, computing, in accordance with an RI corresponding to a CSI process with a highest priority, a Channel Quality Indicator (CQI) and a Precoding Matrix Index (PMI) corresponding to any conflicting CSI process, and feeding back the RI corresponding to the CSI process with the highest priority.

The method may further include:

determining a priority of a CSI process by at least one of the following ways:

determining the priority of the CSI process according to an order in which the CSI process is configured;

determining the priority of the CSI process according to an order of configuring a channel measuring nonzero-power (NZP) CSI Reference Signal (CSI-RS) in the CSI process;

determining the priority of the CSI process in a configured way;

determining the priority of the CSI process according to a type of feeding back a CSI process;

determining the priority of the CSI process according to a mode of feeding back a CSI process;

determining the priority of the CSI process according to an order of configuring an interference measurement resource (IMR) in the CSI process; and determining the priority of the CSI process according to an order of configuring an interference measurement compensating resource in the CSI process.

A device for configuring Channel State Information (CSI) feedback, includes a configuring unit configured for: configuring, for a terminal, multiple CSI processes each including at least channel measuring information and interference measuring information.

The channel measuring information may include one or more sets of nonzero-power (NZP) CSI Reference Signal (CSI-RS) configuring or indicating information.

The interference measuring information may include at least one of:

one or more sets of interference measurement resource (IMR) configuring information or IMR indicating information; and one or more sets of interference measurement compensating NZP CSI-RS configuring information.

A measuring device based on Channel State Information (CSI) feedback configuring information, includes an acquiring unit configured for acquiring multiple CSI processes configured; and a measuring unit configured for performing measurement in accordance with the multiple CSI processes.

Each of the multiple CSI processes may include at least channel measuring information and interference measuring information. The channel measuring information may include one or more sets of nonzero-power (NZP) CSI Reference Signal (CSI-RS) configuring or indicating information.

The interference measuring information may include at least one of:

one or more sets of interference measurement resource (IMR) configuring information or IMR indicating information; and one or more sets of interference measurement compensating NZP CSI-RS configuring information.

A device for feeding back Channel State Information (CSI), includes a determining unit configured for triggering a computing unit when there is a conflict in Rank Indicators (RIs) of multiple CSI processes fed back;

the computing unit configured for computing, in accordance with an RI corresponding to a CSI process with a highest priority, a Channel Quality Indicator (CQI) and a Precoding Matrix Index (PMI) corresponding to any conflicting CSI process; and a feedback unit configured for feeding back the RI corresponding to the CSI process with the highest priority.

In the disclosure, a network side configures, for a terminal via terminal dedicated higher-layer signaling, multiple CSI processes each including at least channel measuring information and interference measuring information. The channel measuring information may include one or more sets of NZP CSI-RS configuring or indicating information. The interference measuring information may include at least one of: one or more sets of interference measurement resource (IMR) configuring information or IMR indicating information; and one or more sets of interference measurement compensating NZP CSI-RS configuring information. The terminal may perform measurement according to the configured CSI processes, and feed back to the network side accordingly. With the disclosure, unified configuration and reception of CSI feedback for the base station side and the terminal side may be implemented, achieving flexible CSI configuration and feedback.

DETAILED DESCRIPTION

In the disclosure, a CSI process refers to a combination of channel information and interference information to be fed back by a terminal side, the combination consisting of a set of channel measuring information and a set of interference measuring information. For a set of CSI with PMI/RI feedback by a terminal side configured, a terminal side may be required to feed back an RI, a PMI and a CQI accordingly. For a set of CSI with no PMI/RI feedback by a terminal side configured, a terminal side may be required to feed back a CQI accordingly.

In the disclosure, an IMR consists of an LTE R10 ZP CSI-RS. An interference compensating resource consists of multiple nonzero-power (NZP) CSI Reference Signals (CSI-RSs) configured, which may be multiple channel measuring NZP CSI-RSs preconfigured.

To clearly show a technical problem to be solved, a technical solution, and beneficial effects of the present disclosure, the present disclosure is further elaborated below with reference to the drawings and embodiments.

Figure 1:
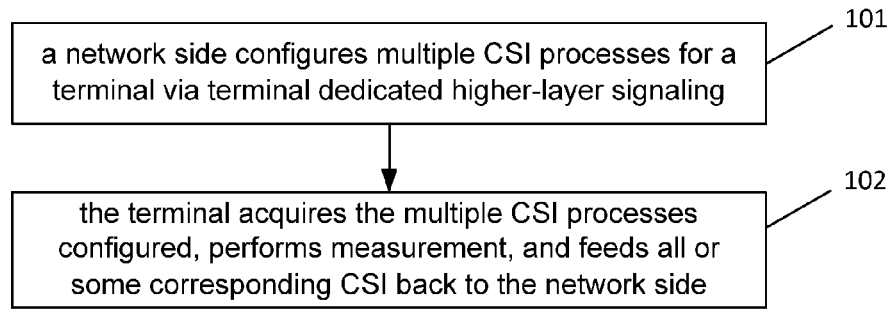
FIG. 1 is a flowchart of a method for feeding back CSI according to an embodiment of the disclosure.

FIG. 1 is a flowchart of a method for feeding back CSI according to an embodiment of the disclosure. As shown in FIG. 1, a method for feeding back CSI of the example may include steps as follows.

In step 101, a network side configures multiple CSI processes for a terminal via terminal dedicated higher-layer signaling.

Assuming that UE1 is an R11 or higher-version user, a base station (the network side) configures multiple CSI processes for the terminal via the terminal dedicated higher-layer signaling. Each such process includes the channel measuring information and the interference measuring information, for indicating the terminal to perform channel measurement on time-domain and/or frequency-domain resources in accordance with the configured multiple CSI processes. The channel measuring information may include one or more sets of NZP CSI-RS configuring or indicating information. The interference measuring information may include at least one kind of configuring or indicating information as follows:

one or more sets of interference measurement resource (IMR) configuring information or IMR indicating information; and one or more sets of interference measurement compensating NZP CSI-RS configuring information.

In step 102, the terminal acquires the multiple CSI processes configured, performs measurement, and feeds all or some CSI back to the network side accordingly.

When there is a conflict in RIs of multiple CSI processes fed back by a terminal, a CQI and a PMI corresponding to any conflicting CSI process may be computed in accordance with an RI corresponding to a CSI process with a highest priority, and the RI corresponding to the CSI process with the highest priority may be fed back.

A priority of a CSI process may be determined as follows.

The priority of the CSI process may be determined according to an order in which the CSI process is configured.

The priority of the CSI process may be determined according to an order of configuring a channel measuring NZP CSI-RS in the CSI process.

The priority of the CSI process may be determined in a configured way.

The priority of the CSI process may be determined according to a type of feeding back a CSI process.

The priority of the CSI process may be determined according to a mode of feeding back a CSI process.

The priority of the CSI process may be determined according to an order of configuring an IMR in the CSI process.

The priority of the CSI process may be determined according to an order of configuring an interference measurement compensating resource in the CSI process.

A technical solution of the disclosure is further illustrated below via specific examples.

Embodiment 1

Assuming that a terminal side is an R11 or higher-version user, a base station configures multiple CSI processes for the terminal via the terminal dedicated higher-layer signaling. Each such process includes the channel measuring information and the interference measuring information, for indicating the terminal to perform channel measurement on time-domain and/or frequency-domain resources in accordance with the configured multiple CSI processes. The channel measuring information may include one or more sets of NZP CSI-RS configuring or indicating information. The interference measuring information may include at least one kind of configuring or indicating information as follows:

one or more sets of interference measurement resource (IMR) configuring information or IMR indicating information; and one or more sets of interference measurement compensating NZP CSI-RS configuring information.

The configured multiple CSI processes may consist of the following signaling:

1. a configured number N of reported processes supported; and
2. process report configuring information.

The configuring information for reporting each process may include the following information:

a set of channel measuring information for reporting a process n, i.e., a set of NZP CSI-RS configuring information, n being a process index; and a set of interference measuring information for reporting the process n, including a set of IMR configuring information and/or a set of interference measurement compensating NZP CSI-RS configuring information or indicating information.

The terminal side may obtain multiple sets of CSI process configuring information by receiving the terminal dedicated higher-layer signaling. Each such process includes the channel measuring information and the interference measuring information, for indicating the terminal to perform channel measurement on time-domain and/or frequency-domain resources in accordance with the configured multCSI processes. The channel measuring information may include one or more sets of NZP CSI-RS configuring or indicating information. The interference measuring information may include at least one kind of configuring or indicating information as follows:

one or more sets of interference measurement resource (IMR) configuring information or IMR indicating information.

one or more sets of interference measurement compensating NZP CSI-RS configuring information.

The configured multiple CSI processes may consist of the following signaling:

1. a configured number N of reported processes supported; and
2. process report configuring information.

The configuring information for reporting each process may include the following information:

a set of channel measuring information for reporting a process n, i.e., a set of NZP CSI-RS configuring information, n being a process index; and a set of interference measuring information for reporting the process n, including a set of IMR configuring information and/or a set of interference measurement compensating NZP CSI-RS configuring information or indicating information.

An example of multiple CSI processes may be as follows.

N processes are reported.

For reporting process 1 there may be:

---
a set of NZP CSI-RS configuration and
an interference measuring part including
{
IMR configuration and
interference measurement compensating resource configuration
}.
---

For reporting process 2 there may be:

---
a set of NZP CSI-RS configuration and
an interference measuring part including
{
IMR configuration and
interference measurement compensating resource configuration
}.
...
---

For reporting process N there may be:

---
a set of NZP CSI-RS configuration and
an interference measuring part including
{
IMR configuration and
interference measurement compensating resource configuration
}.
---

The interference measurement compensating resource configuration may be index information or bitmap information indicating one of multiple sets of interference measurement compensating NZP CSI-RS configuring information preconfigured. Information for configuring an interference measurement compensating NZP CSI-RS may consist of information for configuring one or more NZP CSI-RSs in the channel measuring information.

An example of multiple CSI processes may also be as follows.

N processes are reported.

For reporting process 1 there may be:

---
a set of NZP CSI-RS configuration and
an interference measuring part including
{
IMR configuration
}.
---

For reporting process 2 there may be:

---
a set of NZP CSI-RS configuration and
an interference measuring part including
{
IMR configuration
}.
...
---

For reporting process N there may be:

---
a set of NZP CSI-RS configuration and
an interference measuring part including
{
IMR configuration
}.
---

Embodiment 2

Assuming that a terminal side is an R11 or higher-version user, a base station configures multiple CSI processes for the terminal via the terminal dedicated higher-layer signaling. Each such process includes the channel measuring information and the interference measuring information, for indicating the terminal to perform channel measurement on time-domain and/or frequency-domain resources in accordance with the configured multiple CSI processes. The channel measuring information may include one or more sets of NZP CSI-RS configuring or indicating information. The interference measuring information may include at least one kind of configuring or indicating information as follows:

one or more sets of interference measurement resource (IMR) configuring information or IMR indicating information; and one or more sets of interference measurement compensating NZP CSI-RS configuring information.

The configured multiple CSI processes may consist of process report configuring information.

The configuring information for reporting each process may include the following information:

a set of channel measuring information for reporting a process n, i.e., a set of NZP CSI-RS configuring information, n being a process index; and a set of interference measuring information for reporting the process n, including a set of IMR configuring information and/or a set of interference measurement compensating NZP CSI-RS configuring information or indicating information.

The terminal side may obtain multiple sets of CSI process configuring information by receiving the terminal dedicated higher-layer signaling. Each such process includes the channel measuring information and the interference measuring information, for indicating the terminal to perform channel measurement on time-domain and/or frequency-domain resources in accordance with the configured multCSI processes. The channel measuring information may include one or more sets of NZP CSI-RS configuring or indicating information. The interference measuring information may include at least one kind of configuring or indicating information as follows:

one or more sets of interference measurement resource (IMR) configuring information or IMR indicating information.

one or more sets of interference measurement compensating NZP CSI-RS configuring information.

The configured multiple CSI processes may consist of process report configuring information.

The configuring information for reporting each process may include the following information:

a set of channel measuring information for reporting a process n, i.e., a set of NZP CSI-RS configuring information, n being a process index; and a set of interference measuring information for reporting the process n, including a set of IMR configuring information and/or a set of interference measurement compensating NZP CSI-RS configuring information or indicating information.

An example of multiple CSI processes may be as follows.

For reporting process 1 there may be:

a set of NZP CSI-RS configuration and
an interference measuring part including
{
IMR configuration and
interference measurement compensating resource configuration
}.

For reporting process 2 there may be:

a set of NZP CSI-RS configuration and
an interference measuring part including
{
IMR configuration and
interference measurement compensating resource configuration
}.
...

For reporting process N there may be:

a set of NZP CSI-RS configuration and
an interference measuring part including
{
IMR configuration and
interference measurement compensating resource configuration
}.

The interference measurement compensating resource configuration may be index information or bitmap information indicating one of multiple sets of interference measurement compensating NZP CSI-RS configuring information preconfigured. Information for configuring an interference measurement compensating NZP CSI-RS may consist of information for configuring one or more NZP CSI-RSs in the channel measuring information.

An example of multiple CSI processes may also be as follows.

For reporting process 1 there may be:

a set of NZP CSI-RS configuration and
an interference measuring part including
{
IMR configuration
}.

For reporting process 2 there may be:

a set of NZP CSI-RS configuration and
an interference measuring part including
{
IMR configuration
}.
...

For reporting process N there may be:

a set of NZP CSI-RS configuration and
an interference measuring part including
{
IMR configuration
}.

Embodiment 3

Assuming that a terminal side is an R11 or higher-version user, a base station side may preconfigure for the terminal, via terminal dedicated higher-layer signaling, information for configuring or indicating one or more NZP CSI-RSs for channel measurement, IMRs and/or interference measurement compensating NZP CSI-RSs. The base station side may indicate by indexing or bitmap sequence indexing, channel measuring information and interference measuring information of each of one or more CSI processes configured. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement preconfigured for the terminal by the base station side via the terminal dedicated higher-layer signaling may consist of one or more NZP CSI-RSs.

The one or more IMRs preconfigured for the terminal by the base station side via the terminal dedicated higher-layer signaling may consist of one or more zero-power (ZP) CSI-RSs.

The one or more interference measurement compensating NZP CSI-RSs preconfigured for the terminal by the base station side via the terminal dedicated higher-layer signaling may consist of one or more NZP CSI-RSs in the channel measuring information.

The base station side may indicate the channel measuring information and the interference measuring information of each CSI process through indexing or bitmap sequence indexing by indicating channel measuring information and interference measuring information of a CSI process with N bits. N1 bits of the N bits are for the channel measuring information indicating one of the one or more NZP CSI-RSs for channel measurement preconfigured for the terminal via the terminal dedicated higher-layer signaling. N2 bits of the N bits are for the interference measuring information indicating one of the one or more IMRs for interference measurement preconfigured for the terminal via the terminal dedicated higher-layer signaling. N3 bits of the N bits are for the interference measuring information indicating one of the one or more interference measurement compensating NZP CSI-RSs for interference measurement compensation preconfigured for the terminal via the terminal dedicated higher-layer signaling. N1+N2+N3=N, and N1>0, N2>0, N3>_0.

The terminal side may receive beforehand, via the terminal dedicated higher-layer signaling, information for configuring or indicating one or more NZP CSI-RSs for channel measurement, IMRs and/or interference measurement compensating NZP CSI-RSs. The terminal side may obtain, by indexing or bitmap sequence indexing using the received terminal dedicated higher-layer signaling, channel measuring information and interference measuring information of each of one or more CSI processes. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement obtained by the terminal side beforehand via the terminal dedicated higher-layer signaling may consist of one or more NZP CSI-RSs.

The one or more IMRs obtained by the terminal side beforehand via the terminal dedicated higher-layer signaling may consist of one or more ZP CSI-RSs.

The information for configuring one or more interference measurement compensating NZP CSI-RSs obtained by the terminal side beforehand via the terminal dedicated higher-layer signaling may consist of information for configuring one or more NZP CSI-RSs in the channel measuring information.

Alternatively, by indexing or bitmap sequence indexing using the received terminal dedicated higher-layer signaling, channel measuring information and interference measuring information of a CSI process may be indicated with N bits. N1 bits of the N bits are for the channel measuring information indicating one of the one or more NZP CSI-RSs for channel measurement obtained beforehand via the terminal dedicated higher-layer signaling. N2 bits of the N bits are for the interference measuring information indicating one of the one or more IMRs for interference measurement obtained beforehand via the terminal dedicated higher-layer signaling. N3 bits of the N bits are for the interference measuring information indicating one of the one or more interference measurement compensating NZP CSI-RSs for interference measurement compensation obtained beforehand via the terminal dedicated higher-layer signaling. N1+N2+N3=N, and N1>0, N2>0, N3≥0.

An interference compensating CSI signal may be a CSI-RS in channel measuring information.

Example 1

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 2A:
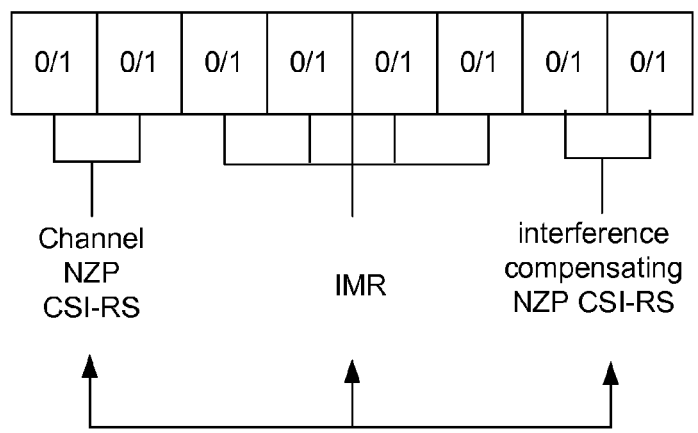
FIG. 2a is a schematic diagram of a format of CSI process 1 according to Example 1 of Embodiment 3.

FIG. 2a is a schematic diagram of a format of CSI process 1 according to Example 1.

Figure 2B:
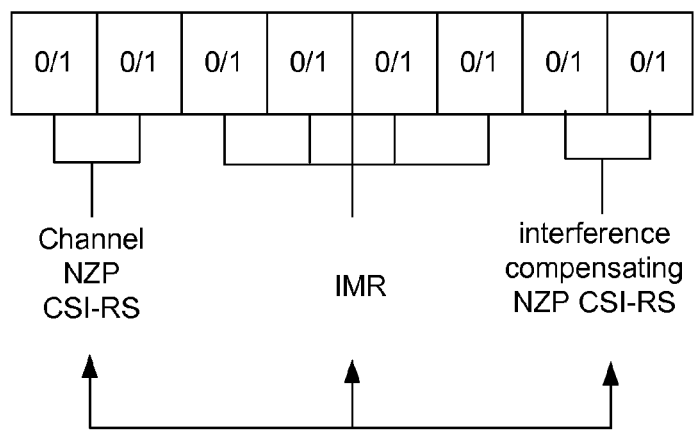
FIG. 2b is a schematic diagram of a format of CSI process N according to Example 1 of Embodiment 3.

FIG. 2b is a schematic diagram of a format of CSI process N according to Example 1.

An 8-bit sequence may be adopted for indexing, by indicating the channel measuring information with 2 bits, indicating IMR information in the interference measuring information with 4 bits, and indicating interference measurement compensating information in the interference measuring information with 2 bits.

Example 2

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 2C:
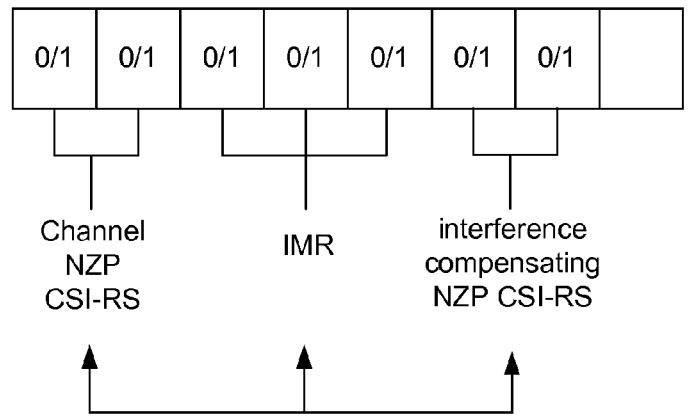
FIG. 2c is a schematic diagram of a format of CSI process 1 according to Example 2 of Embodiment 3.

FIG. 2c is a schematic diagram of a format of CSI process 1 according to Example 2.

Figure 2D:
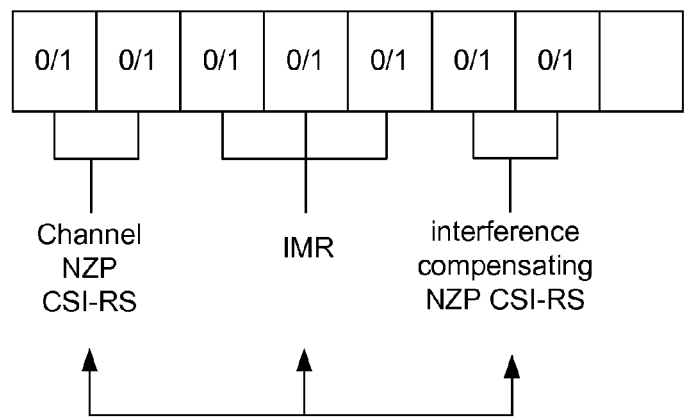
FIG. 2d is a schematic diagram of a format of CSI process N according to Example 2 of Embodiment 3.

FIG. 2d is a schematic diagram of a format of CSI process N according to Example 2.

A 7-bit sequence may be adopted for indexing, by indicating the channel measuring information with 2 bits, indicating IMR information in the interference measuring information with 3 bits, and indicating interference measurement compensating information in the interference measuring information with 2 bits.

Example 3

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 2E:
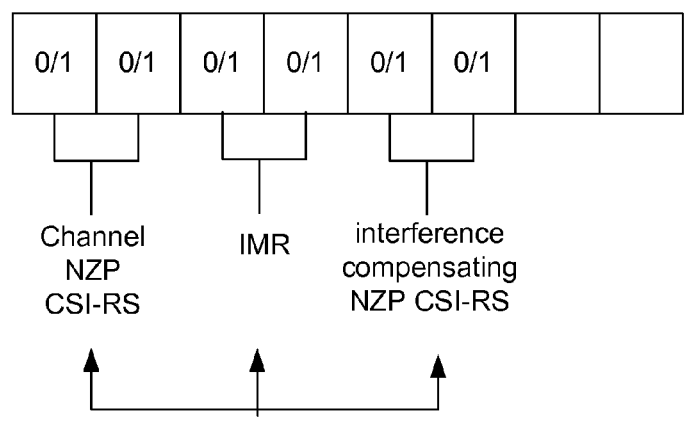
FIG. 2e is a schematic diagram of a format of CSI process 1 according to Example 3 of Embodiment 3.

FIG. 2e is a schematic diagram of a format of CSI process 1 according to Example 3.

Figure 2F:
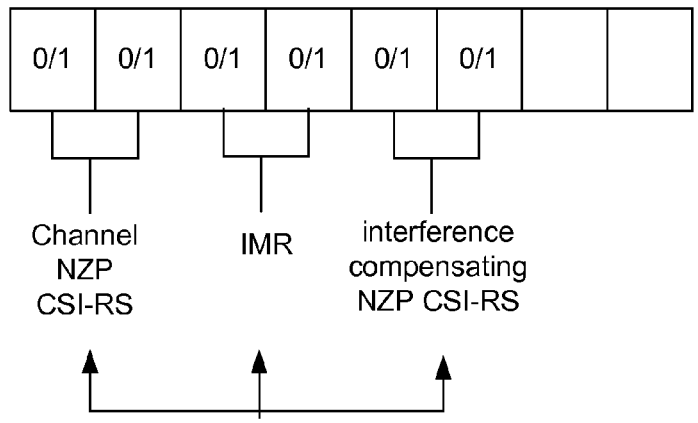
FIG. 2f is a schematic diagram of a format of CSI process N according to Example 3 of Embodiment 3.

FIG. 2f is a schematic diagram of a format of CSI process N according to Example 3.

A 6-bit sequence may be adopted for indexing, by indicating the channel measuring information with 2 bits, indicating IMR information in the interference measuring information with 2 bits, and indicating interference measurement compensating information in the interference measuring information with 2 bits.

Example 4

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 2G:
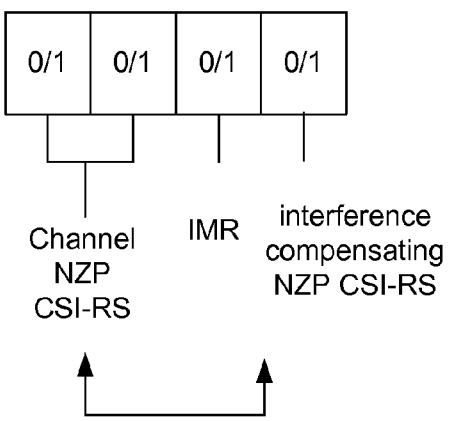
FIG. 2g is a schematic diagram of a format of CSI process 1 according to Example 4 of Embodiment 3.

FIG. 2g is a schematic diagram of a format of CSI process 1 according to Example 4.

Figure 2H:
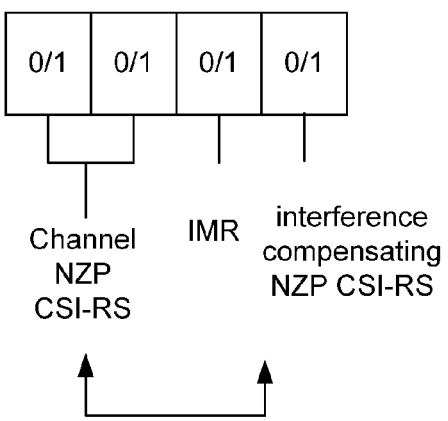
FIG. 2h is a schematic diagram of a format of CSI process N according to Example 4 of Embodiment 3.

FIG. 2h is a schematic diagram of a format of CSI process N according to Example 4.

A 4-bit sequence may be adopted for indexing, by indicating the channel measuring information with 2 bits, indicating IMR information in the interference measuring information with 1 bit, and indicating interference measurement compensating information in the interference measuring information with 1 bit.

Example 5

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 2I:
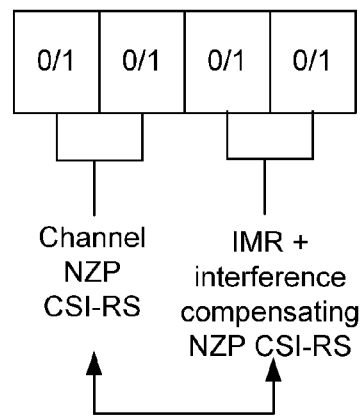
FIG. 2i is a schematic diagram of a format of CSI process 1 according to Example 5 of Embodiment 3.

FIG. 2i is a schematic diagram of a format of CSI process 1 according to Example 5.

Figure 2J:
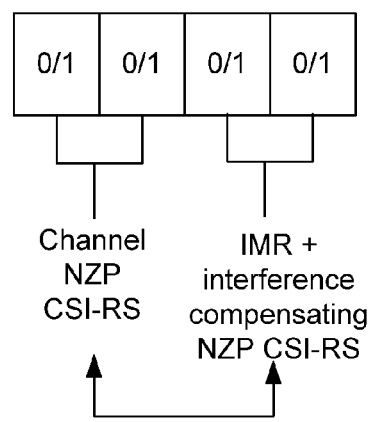
FIG. 2j is a schematic diagram of a format of CSI process N according to Example 5 of Embodiment 3.

FIG. 2j is a schematic diagram of a format of CSI process N according to Example 5.

A 4-bit sequence may be adopted for indexing, by indicating the channel measuring information with 2 bits, and indicating, with joint coding, IMR information and interference measurement compensating information in the interference measuring information with 2 bits.

Embodiment 4

Assuming that a terminal side is an R11 or higher-version user, a base station side may preconfigure for the terminal, via terminal dedicated higher-layer signaling, information for configuring or indicating one or more NZP CSI-RSs for channel measurement, IMRs and/or interference measurement compensating NZP CSI-RSs.

The base station side may indicate by indexing or bitmap sequence indexing, channel measuring information and interference measuring information of each of one or more CSI processes configured. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement preconfigured for the terminal by the base station side via the terminal dedicated higher-layer signaling may consist of one or more NZP CSI-RSs.

The one or more IMRs preconfigured for the terminal by the base station side via the terminal dedicated higher-layer signaling may consist of one or more ZP CSI-RSs.

The one or more interference measurement compensating NZP CSI-RSs preconfigured for the terminal by the base station side via the terminal dedicated higher-layer signaling may consist of one or more NZP CSI-RSs in the channel measuring information.

The base station side may indicate the channel measuring information and the interference measuring information of each CSI process through indexing or bitmap sequence indexing by indicating channel measuring information and interference measuring information of a CSI process with N bits. N1 bits of the N bits are for the channel measuring information indicating one of the one or more NZP CSI-RSs for channel measurement preconfigured for the terminal via the terminal dedicated higher-layer signaling. N2 bits of the N bits are for the interference measuring information indicating, with joint coding, one of the one or more IMRs for interference measurement preconfigured for the terminal via the terminal dedicated higher-layer signaling, as well as one of the one or more interference measurement compensating NZP CSI-RSs for interference measurement compensation preconfigured for the terminal via the terminal dedicated higher-layer signaling. N1+N2=N, and N1>0, N2>0, N>0.

The terminal side may receive beforehand, via the terminal dedicated higher-layer signaling, information for configuring or indicating one or more NZP CSI-RSs for channel measurement, IMRs and/or interference measurement compensating NZP CSI-RSs. The terminal side may obtain, by indexing or bitmap sequence indexing using the received terminal dedicated higher-layer signaling, channel measuring information and interference measuring information of each of one or more CSI processes. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement obtained by the terminal side beforehand via the terminal dedicated higher-layer signaling may consist of one or more NZP CSI-RSs.

The one or more IMRs obtained by the terminal side beforehand via the terminal dedicated higher-layer signaling may consist of one or more ZP CSI-RSs.

The information for configuring one or more interference measurement compensating NZP CSI-RSs obtained by the terminal side beforehand via the terminal dedicated higher-layer signaling may consist of information for configuring one or more NZP CSI-RSs in the channel measuring information.

Alternatively, by indexing or bitmap sequence indexing using the received terminal dedicated higher-layer signaling, channel measuring information and interference measuring information of a CSI process may be indicated with N bits. N1 bits of the N bits are for the channel measuring information indicating one of the one or more NZP CSI-RSs for channel measurement obtained beforehand via the terminal dedicated higher-layer signaling. N2 bits of the N bits are for the interference measuring information indicating, with joint coding, one of the one or more IMRs for interference measurement obtained beforehand via the terminal dedicated higher-layer signaling, as well as one of the one or more interference measurement compensating NZP CSI-RSs for interference measurement compensation obtained beforehand via the terminal dedicated higher-layer signaling. N1+N2=N, and N1>0, N2>0, N>0.

An interference compensating CSI signal may be a CSI-RS in channel measuring information.

Embodiment 5

Assuming that a terminal side is an R11 or higher-version user, a base station side may preconfigure for the terminal, via terminal dedicated higher-layer signaling, information for configuring or indicating one or more NZP CSI-RSs for channel measurement, IMRs and/or interference measurement compensating NZP CSI-RSs. The base station side may indicate by indexing or bitmap sequence indexing, channel measuring information and interference measuring information of each of one or more CSI processes configured. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement preconfigured for the terminal by the base station side via the terminal dedicated higher-layer signaling may consist of one or more NZP CSI-RSs.

The one or more IMRs preconfigured for the terminal by the base station side via the terminal dedicated higher-layer signaling may consist of one or more ZP CSI-RSs.

The base station side may indicate the channel measuring information and the interference measuring information of each CSI process through indexing or bitmap sequence indexing by indicating channel measuring information and interference measuring information of a CSI process with N bits. N1 bits of the N bits are for the channel measuring information indicating one of the one or more NZP CSI-RSs for channel measurement preconfigured for the terminal via the terminal dedicated higher-layer signaling. N2 bits of the N bits are for the interference measuring information indicating one of the one or more IMRs for interference measurement preconfigured for the terminal via the terminal dedicated higher-layer signaling. N1+N2=N, and N1>0, N2>0.

The terminal side may receive beforehand, via the terminal dedicated higher-layer signaling, information for configuring or indicating one or more NZP CSI-RSs for channel measurement, IMRs and/or interference measurement compensating NZP CSI-RSs. The terminal side may obtain, by indexing or bitmap sequence indexing using the received terminal dedicated higher-layer signaling, channel measuring information and interference measuring information of each of one or more CSI processes. The channel measuring information of each CSI process may consist of information for configuring a NZP CSI-RS. The interference measuring information of each CSI process may consist of a set of IMR configuring information and/or a set of interference measurement compensating NZP CSI-RS configuring information.

The one or more NZP CSI-RSs for channel measurement obtained by the terminal side beforehand via the terminal dedicated higher-layer signaling may consist of one or more NZP CSI-RSs.

The one or more IMRs obtained by the terminal side beforehand via the terminal dedicated higher-layer signaling may consist of one or more ZP CSI-RSs.

Alternatively, by indexing or bitmap sequence indexing using the received terminal dedicated higher-layer signaling, channel measuring information and interference measuring information of a CSI process may be indicated with N bits. N1 bits of the N bits are for the channel measuring information indicating one of the one or more NZP CSI-RSs for channel measurement obtained beforehand via the terminal dedicated higher-layer signaling. N2 bits of the N bits are for the interference measuring information indicating one of the one or more IMRs for interference measurement obtained beforehand via the terminal dedicated higher-layer signaling. N1+N2=N, and N1>0, N2>0.

Example 1

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Figure 3A:
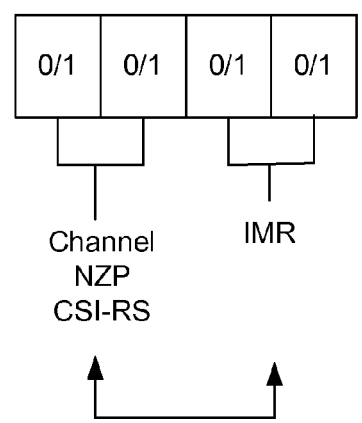
FIG. 3a is a schematic diagram of a format of CSI process 1 according to Example 1 of Embodiment 5.

FIG. 3a is a schematic diagram of a format of CSI process 1 according to Example 1.

Figure 3B:
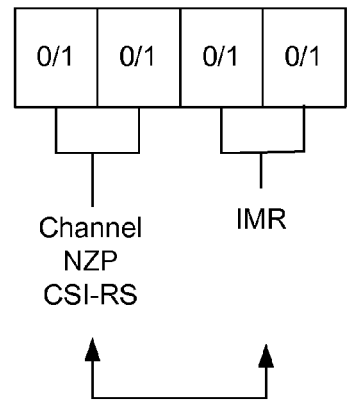
FIG. 3b is a schematic diagram of a format of CSI process N according to Example 1 of Embodiment 5.

FIG. 3b is a schematic diagram of a format of CSI process N according to Example 2.

A 4-bit sequence may be adopted for indexing, by indicating the channel measuring information with 2 bits, and indicating IMR information in the interference measuring information with 2 bits.

Embodiment 6

A base station side may preconfigure for the terminal, via terminal dedicated higher-layer signaling, information for configuring or indicating one or more NZP CSI-RSs for channel measurement, IMRs and/or interference measurement compensating NZP CSI-RSs. The base station side may notify, via a beforehand agreement or via higher-layer signaling, the terminal side of channel measuring information and interference measuring information of a CSI process.

The base station side may indicate, by bitmap sequence indexing, the terminal side to feed back one or more CSI processes accordingly.

The channel measuring information and the interference measuring information may form N CSI processes. The base station side may notify, with an N-bit bitmap sequence, the terminal side to feed back M of the N CSI processes. M may be a number of bits with a value of 1 or a number of bits with a value of 0 in the N-bit bitmap sequence.

The terminal side may obtain beforehand, via terminal dedicated higher-layer signaling, information for configuring or indicating one or more NZP CSI-RSs for channel measurement, IMRs and/or interference measurement compensating NZP CSI-RSs. The terminal side may obtain, via a beforehand agreement or via higher-layer signaling, channel measuring information and interference measuring information of a CSI process.

The terminal side may obtain, by bitmap sequence indexing via terminal dedicated higher-layer signaling, one or more CSI processes to be fed back.

The channel measuring information and the interference measuring information may form N CSI processes. The terminal side may obtain, by receiving an N-bit bitmap sequence of terminal dedicated higher-layer signaling, M of the N CSI processes to be fed back. M may be a number of bits with a value of 1 or a number of bits with a value of 0 in the N-bit bitmap sequence.

Example 1

There may be three sets of channel measuring information of

{
a first NZP CSI-RS,
a second NZP CSI-RS, and
a third NZP CSI-RS
}.

The interference measuring information may include

{
a first set of IMRs,
a second set of IMRs, and
a third set of IMRs
}.

Altogether, there may be 9 CSI processes corresponding to 9 combinations of the three sets of channel measuring information and three sets of IMRs.

For example:

CSI process 1 may contain the first NZP CSI-RS+the first set of IMRs;

CSI process 2 may contain the first NZP CSI-RS+the second set of IMRs;

CSI process 3 may contain the first NZP CSI-RS+the third set of IMRs;

CSI process 4 may contain the second NZP CSI-RS+the first set of IMRs;

CSI process 5 may contain the second NZP CSI-RS+the second set of IMRs;

CSI process 6 may contain the second NZP CSI-RS+the third set of IMRs;

CSI process 7 may contain the third NZP CSI-RS+the first set of IMRs;

CSI process 8 may contain the third NZP CSI-RS+the second set of IMRs; and

Figure 4A:
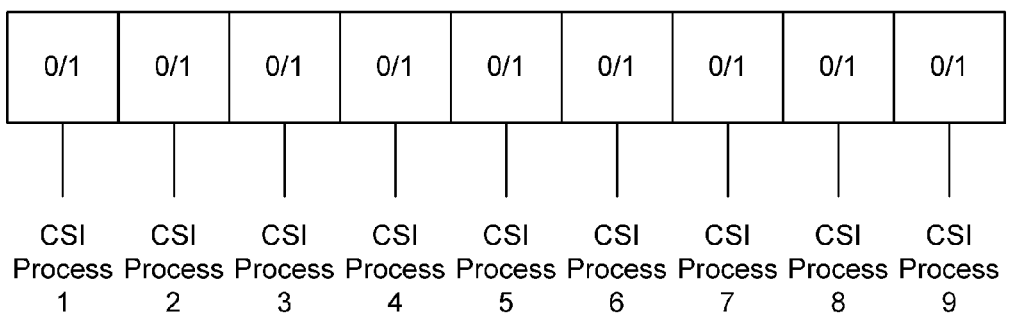
FIG. 4a is a schematic diagram of a format of a CSI process according to Example 1 of Embodiment 6.

CSI process 9 may contain the third NZP CSI-RS+the third set of IMRs;

As shown in FIG. 4a, Bitmap signaling may be 9-bit indicator signaling, with each bit indicating a CSI process respectively.

A bit with a value of 1 may represent a CSI process to be fed back. A bit with a value of 0 may represent a CSI process not to be fed back.

Example 2

There may be three sets of channel measuring information of

{
a first NZP CSI-RS,
a second NZP CSI-RS, and
a third NZP CSI-RS
}.

The interference measuring information may include

```
{
a first set of IMRs
}.
```

Altogether, there may be 9 CSI processes corresponding to 9 combinations of three sets of channel measuring information, a set of IMRs, and three sets of interference measurement compensating resources. The interference measurement compensating resources may adopt configuration of the channel measuring information.

For example:

CSI process 1 may contain the first NZP CSI-RS+the first set of IMRs+the second NZP CSI-RS as interference compensating resources;

CSI process 2 may contain the first NZP CSI-RS+the first set of IMRs+the third NZP CSI-RS as interference compensating resources;

CSI process 3 may contain the first NZP CSI-RS+the first set of IMRs+the second NZP CSI-RS as interference compensating resources+the third NZP CSI-RS as interference compensating resources;

CSI process 4 may contain the second NZP CSI-RS+the first set of IMRs+the first NZP CSI-RS as interference compensating resources;

CSI process 5 may contain the second NZP CSI-RS+the first set of IMRs+the third NZP CSI-RS as interference compensating resources;

CSI process 6 may contain the second NZP CSI-RS+the first set of IMRs+the first NZP CSI-RS as interference compensating resources+the third NZP CSI-RS as interference compensating resources;

CSI process 7 may contain the third NZP CSI-RS+the first set of IMRs+the first NZP CSI-RS as interference compensating resources;

CSI process 8 may contain the third NZP CSI-RS+the first set of IMRs+the second NZP CSI-RS as interference compensating resources; and CSI process 9 may contain the third NZP CSI-RS+the first set of IMRs+the first NZP CSI-RS as interference compensating resources+the second NZP CSI-RS as interference compensating resources.

Figure 4B:
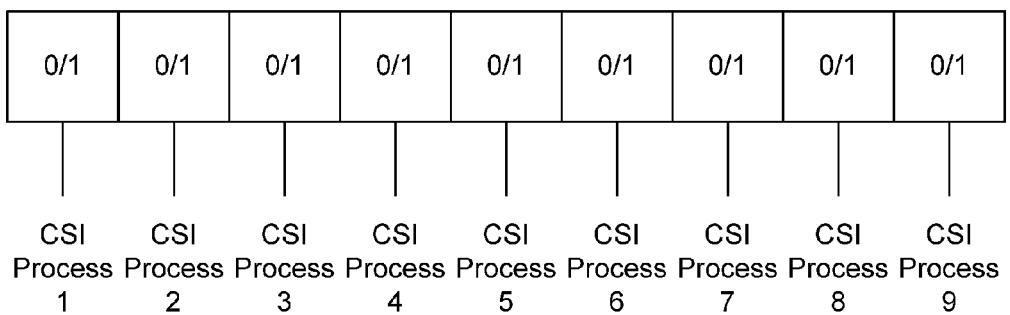
FIG. 4b is a schematic diagram of a format of a CSI process according to Example 2 of Embodiment 6.

As shown in FIG. 4b, Bitmap signaling may be 9-bit indicator signaling, with each bit indicating a CSI process respectively.

A bit with a value of 1 may represent a CSI process to be fed back. A bit with a value of 0 may represent a CSI process not to be fed back.

A Bitmap of 4 bits, 6 bits, 8 bits, 16 bits or the like may also be implemented by defining CSI process configuration.

Embodiment 7

A base station side may preconfigure for the terminal, via terminal dedicated higher-layer signaling, information for configuring or indicating one or more NZP CSI-RSs for channel measurement, IMRs and/or interference measurement compensating NZP CSI-RSs. Information for configuring or indicating one or more IMRs and/or interference measurement compensating NZP RSs may be configured corresponding to each set of NZP channel measuring reference signal configuring information.

The one or more IMRs preconfigured for the terminal by the base station side via the terminal dedicated higher-layer signaling may consist of one or more ZP CSI-RSs.

The terminal side may obtain beforehand, via terminal dedicated higher-layer signaling, information for configuring or indicating one or more NZP CSI-RSs for channel measurement, IMRs and/or interference measurement compensating NZP CSI-RSs. Information for configuring or indicating one or more IMRs and/or interference measurement compensating NZP RSs may be configured corresponding to each set of NZP channel measuring reference signal configuring information.

The one or more IMRs obtained by the terminal side beforehand via the terminal dedicated higher-layer signaling may consist of one or more ZP CSI-RSs. The interference measurement compensating resources may adopt configuration of the channel measuring information. IMRs corresponding to different interference measurement information may or may not be the same.

Example 1

There may be three sets of channel measuring resources of

```
{
a first NZP CSI-RS and
IMRs
{
a first interference measurement with
{
``` a first set of IMRs+a first set of interference measurement compensating resources the first set of IMRs+a second set of interference measurement compensating resources the first set of IMRs+a third set of interference measurement compensating resources

```
}.
a second set of interference measurement with
{
``` a second set of IMRs+the first set of interference measurement compensating resources the second set of IMRs+the second set of interference measurement compensating resources the second set of IMRs+the third set of interference measurement compensating resources

```
}.
}.
... ...
an Nth NZP CSI-RS and
``` a set of interference measurements including

```
{
a first interference measurement with
{
``` the first set of IMRs+the first set of interference measurement compensating resources the first set of IMRs+the second set of interference measurement compensating resources the first set of IMRs+the third set of interference measurement compensating resources

```
}.
  a second set of interference measurement with
  {
``` the second set of IMRs+the first set of interference measurement compensating resources
the second set of IMRs+the second set of interference measurement compensating resources
the second set of IMRs+the third set of interference measurement compensating resources

```
              }.
            }.
```

Example 2

There may be three sets of channel measuring resources of

```
            {
            a first NZP CSI-RS and
            IMRs
            {
            a first set of IMRs
            a second set of IMRs
            }.
            }.
            ... ...
            an Nth NZP CSI-RS
            a set of interference measurements including
            {
            the first set of IMRs
            the second set of IMRs
            }.
            }.
```

Embodiment 7

When there is a conflict in Rank Indicators (RIs) of multiple CSI processes fed back by a terminal, the terminal may compute, in accordance with an RI corresponding to a CSI process with a highest priority, a Channel Quality Indicator (CQI) and a Precoding Matrix Index (PMI) corresponding to any conflicting CSI process, and feeding back the RI corresponding to the CSI process with the highest priority.

A priority of a CSI process may be determined by at least one of the following ways.

1. The priority of a CSI process may be determined according to an order in which the CSI process is configured in terminal dedicated higher-layer signaling.

2. The priority of a CSI process may be determined according to an order of configuring a channel measuring NZP CSI-RS in the CSI process in terminal dedicated higher-layer signaling.

3. The priority of a CSI process may be configured via terminal dedicated higher-layer signaling.

4. The priority of a CSI process may be determined according to a type of feeding back a CSI process.

5. The priority of a CSI process may be determined according to a mode of feeding back a CSI process.

6. The priority of a CSI process may be determined according to an order of configuring an IMR in the CSI process in terminal dedicated higher-layer signaling.

7. The priority of a CSI process may be determined according to an order of configuring an interference measurement compensating resource in the CSI process in terminal dedicated higher-layer signaling.

Figure 5:
FIG. 5 is a schematic diagram of a structure of a device for configuring CSI feedback according to an embodiment of the disclosure.

FIG. 5 is a schematic diagram of a structure of a device for configuring CSI feedback according to an embodiment of the disclosure. As shown in FIG. 5, a configuring unit 20 of the device for configuring CSI feedback of the example is configured for: configuring, for a terminal, multiple CSI processes each including at least channel measuring information and interference measuring information.

The channel measuring information includes one or more sets of nonzero-power (NZP) CSI Reference Signal (CSI-RS) configuring or indicating information.

The interference measuring information includes at least one of:

one or more sets of interference measurement resource (IMR) configuring information or IMR indicating information; and one or more sets of interference measurement compensating NZP CSI-RS configuring information.

Refer to aforementioned embodiments for configuration of multiple CSI processes for a terminal, details of which will not be repeated.

Those skilled in the art will know that a function implemented by a processing unit in the device for configuring CSI feedback as shown in FIG. 5 may be understood with reference to description of aforementioned Embodiment 1 to Embodiment 7. Those skilled in the art will know that a function implemented by a processing unit in the device for configuring CSI feedback as shown in FIG. 5 may be implemented via a program run on a processor or via a specific logic circuit.

Figure 6:
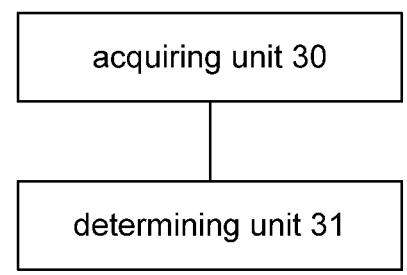
FIG. 6 is a schematic diagram of a structure of a measuring device based on CSI feedback configuring information according to an embodiment of the disclosure.

FIG. 6 is a schematic diagram of a structure of a measuring device based on CSI feedback configuring information according to an embodiment of the disclosure. As shown in FIG. 6, the measuring device based on CSI feedback configuring information of the example includes an acquiring unit 30 and a measuring unit 31.

The acquiring unit 30 may be configured for acquiring multiple CSI processes configured.

The measuring unit 31 may be configured for performing measurement in accordance with the multiple CSI processes.

Each of the multiple CSI processes may include at least channel measuring information and interference measuring information. The channel measuring information may include one or more sets of NZP CSI-RS configuring or indicating information.

The interference measuring information may include at least one of:

one or more sets of interference measurement resource (IMR) configuring information or IMR indicating information; and one or more sets of interference measurement compensating NZP CSI-RS configuring information.

The acquiring unit 30 may acquire the multiple CSI processes configured by receiving terminal dedicated higher-layer signaling.

Refer to aforementioned embodiments for information on the multiple CSI processes configured for a terminal, details of which will not be repeated.

Those skilled in the art will know that a function implemented by a processing unit in the measuring device based on CSI feedback configuring information as shown in FIG. 6 may be understood with reference to description of aforementioned Embodiment 1 to Embodiment 7. Those skilled in the art will know that a function implemented by a processing unit in the measuring device based on CSI feedback configuring information as shown in FIG. 6 may be implemented via a program run on a processor or via a specific logic circuit.

Figure 7:
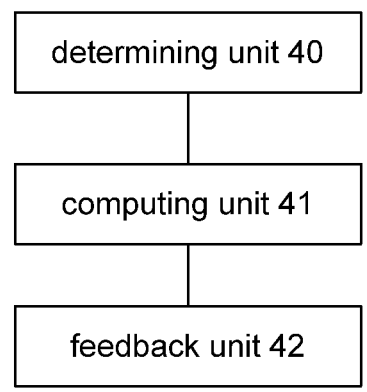
FIG. 7 is a schematic diagram of a structure of a device for feeding back CSI according to an embodiment of the disclosure.

FIG. 7 is a schematic diagram of a structure of a device for feeding back CSI according to an embodiment of the disclosure. As shown in FIG. 7, the device for feeding back CSI of the example may include a determining unit 40, a computing unit 41 and a feedback unit 42.

The determining unit 40 may be configured for triggering a computing unit when there is a conflict in Rank Indicators (RIs) of multiple CSI processes fed back.

The computing unit 41 configured for computing, in accordance with an RI corresponding to a CSI process with a highest priority, a Channel Quality Indicator (CQI) and a Precoding Matrix Index (PMI) corresponding to any conflicting CSI process.

The feedback unit 42 may be configured for feeding back the RI corresponding to the CSI process with the highest priority.

A priority of a CSI process may be determined by at least one of the following ways.

1. The priority of a CSI process may be determined according to an order in which the CSI process is configured in terminal dedicated higher-layer signaling.

2. The priority of a CSI process may be determined according to an order of configuring a channel measuring NZP CSI-RS in the CSI process in terminal dedicated higher-layer signaling.

3. The priority of a CSI process may be configured via terminal dedicated higher-layer signaling.

4. The priority of a CSI process may be determined according to a type of feeding back a CSI process.

5. The priority of a CSI process may be determined according to a mode of feeding back a CSI process.

6. The priority of a CSI process may be determined according to an order of configuring an IMR in the CSI process in terminal dedicated higher-layer signaling.

7. The priority of a CSI process may be determined according to an order of configuring an interference measurement compensating resource in the CSI process in terminal dedicated higher-layer signaling.

Those skilled in the art will know that a function implemented by a processing unit in the device for feeding back CSI as shown in FIG. 7 may be understood with reference to description of aforementioned Embodiment 1 to Embodiment 7. Those skilled in the art will know that a function implemented by a processing unit in the device for feeding back CSI as shown in FIG. 7 may be implemented via a program run on a processor or via a specific logic circuit.

What described are merely embodiments of the disclosure, and are not for limiting the scope of the disclosure.

INDUSTRIAL APPLICABILITY

A network side of the disclosure configures, for a terminal via terminal dedicated higher-layer signaling, multiple CSI processes each including at least channel measuring information and interference measuring information. The channel measuring information may include one or more sets of NZP CSI-RS configuring or indicating information. The terminal may perform measurement according to the configured CSI processes, and feed back to the network side accordingly, thereby implementing unified configuration and reception of CSI feedback for the base station side and the terminal side for flexible CSI configuration and feedback.

The invention claimed is:

1. A method for configuring Channel State Information (CSI) feedback, comprising:
configuring, for a terminal, multiple CSI processes each comprising at least channel measuring information and interference measuring information, wherein
the channel measuring information comprises one or more sets of nonzero-power (NZP) CSI Reference Signal (CSI-RS) configuring or indicating information; and
the interference measuring information comprises at least one of:
one or more sets of interference measurement resource (IMR) configuring information or IMR indicating information; and
one or more sets of interference measurement compensating NZP CSI-RS configuring information,
wherein the method further comprises:
forming P CSI processes with one or more sets of channel measuring information and one or more sets of interference measuring information, and notifying, via a P-bit bitmap, the terminal to feed back Q of the P CSI processes, wherein the Q is a number of bits with a value of 1 in the P-bit bitmap or a number of bits with a value of 0 in the P-bit bitmap, both the P and the Q being natural numbers.

2. The method according to claim 1, further comprising:
configuring, for the terminal, information for configuring or indicating one or more NZP CSI-RSs for channel measurement, IMRs and/or interference measurement compensating NZP CSI-RSs.

3. The method according to claim 2, further comprising:
configuring, for each set of NZP channel measuring reference signal configuring information, information for configuring or indicating one or more IMRs and/or interference measurement compensating NZP RSs.

4. The method according to claim 3, wherein the one or more IMRs consist of one or more zero-power (ZP) CSI-RSs.

5. The method according to claim 2, further comprising:
indicating, with index information or bitmap information, channel measuring information and interference measuring information of each of one or more CSI processes configured, wherein the channel measuring information of the each of one or more CSI processes configured consists of information for configuring a NZP CSI-RS; and the interference measuring information of the each of one or more CSI processes configured consists of a set of IMR configuring information and a set of interference measurement compensating NZP CSI-RS configuring information, or consists of a set of IMR configuring information.

6. The method according to claim 5, wherein the one or more NZP CSI-RSs for channel measurement consist of one or more NZP CSI-RSs;
the one or more IMRs consist of one or more zero-power (ZP) CSI-RSs; and
the information for configuring the one or more interference measurement compensating NZP CSI-RSs consists of information for configuring one or more NZP CSI-RSs in the channel measuring information,
and/or the indicating, with the index information, the channel measuring information and the interference measuring information of the each of one or more CSI processes configured comprises:
indicating channel measuring information and interference measuring information of a CSI process with M bits, wherein M1 bits are for the channel measuring information indicating one of the configured one or more NZP CSI-RSs for channel measurement, and M2 bits are for the interference measuring information indicating one of the configured one or more IMRs for interference measurement, the M1, the M2, and the M all being natural numbers, with M1+M2=M.

7. The method according to claim 5, wherein the indicating, with the index information, the channel measuring information and the interference measuring information of the each of one or more CSI processes configured comprises:
indicating channel measuring information and interference measuring information of a CSI process with M bits, wherein M1 bits are for the channel measuring information indicating one of the configured one or more NZP CSI-RSs for channel measurement, M2 bits are for the interference measuring information indicating one of the configured one or more IMRs for interference measurement, and M3 bits are for the interference measuring information indicating one of the configured one or more interference measurement compensating NZP CSI-RSs for interference measurement compensation, the M1, the M2, the M3, and the M all being natural numbers, with M1+M2+M3=M,
and/or the indicating, with the index information, the channel measuring information and the interference measuring information of the each of one or more CSI processes configured comprises:
indicating channel measuring information and interference measuring information of a CSI process with M bits, wherein M1 bits are for the channel measuring information indicating one of the configured one or more NZP CSI-RSs for channel measurement, and M2 bits are for the interference measuring information indicating, with joint coding, one of the configured one or more IMRs for interference measurement and indicating one of the configured one or more interference measurement compensating NZP CSI-RSs for interference measurement compensation, the M1, the M2, and the M all being natural numbers, with M1+M2=M.

8. The method according to claim 5, wherein the indicating, with the index information, the channel measuring information and the interference measuring information of the each of one or more CSI processes configured comprises:
indicating the channel measuring information with 2 bits, indicating IMR information in the interference measuring information with 4 bits, and indicating interference measurement compensating information in the interference measuring information with 2 bits;
or, indicating the channel measuring information with 2 bits, indicating IMR information in the interference measuring information with 3 bits, and indicating interference measurement compensating information in the interference measuring information with 2 bits;
or, indicating the channel measuring information with 2 bits, indicating IMR information in the interference measuring information with 2 bits, and indicating interference measurement compensating information in the interference measuring information with 2 bits;
or, indicating the channel measuring information with 2 bits, indicating IMR information in the interference measuring information with 1 bit, and indicating interference measurement compensating information in the interference measuring information with 1 bit;
or, indicating the channel measuring information with 2 bits, and indicating, with joint coding, IMR information and interference measurement compensating information in the interference measuring information with 2 bits.

9. A measuring method based on Channel State Information (CSI) feedback configuring information, comprising:
acquiring, by a terminal, multiple CSI processes configured, and performing measurement in accordance with the multiple CSI processes, wherein each of the multiple CSI processes comprises at least channel measuring information and interference measuring information; the channel measuring information comprises one or more sets of nonzero-power (NZP) CSI Reference Signal (CSI-RS) configuring or indicating information; and
the interference measuring information comprises at least one of:
one or more sets of interference measurement resource (IMR) configuring information or IMR indicating information; and
one or more sets of interference measurement compensating NZP CSI-RS configuring information,
wherein P CSI processes are formed with one or more sets of channel measuring information and one or more sets of interference measuring information, and the terminal is notified, via a P-bit bitmap, to feed back Q of the P CSI processes, wherein the Q is a number of bits with a value of 1 in the P-bit bitmap or a number of bits with a value of 0 in the P-bit bitmap, both the P and the Q being natural numbers.

10. The method according to claim 9, further comprising:
acquiring, by the terminal, configured information for configuring or indicating one or more NZP CSI-RSs for channel measurement, multiple IMRs and/or multiple interference measurement compensating NZP CSI-RSs.

11. The method according to claim 10, further comprising:
acquiring, by the terminal, index information or bitmap information indicating channel measuring information and interference measuring information of each of one or more CSI processes, wherein the channel measuring information of the each of one or more CSI processes configured consists of information for configuring a NZP CSI-RS; and the interference measuring information of the each of one or more CSI processes configured consists of a set of IMR configuring information and a set of interference measurement compensating NZP CSI-RS configuring information, or consists of a set of IMR configuring information.

12. The method according to claim 11, wherein the one or more NZP CSI-RSs for channel measurement consist of one or more NZP CSI-RSs;
the one or more IMRs consist of one or more zero-power (ZP) CSI-RSs; and
the information for configuring the one or more interference measurement compensating NZP CSI-RSs consists of information for configuring one or more NZP CSI-RSs in the channel measuring information,
and/or the index information indicates channel measuring information and interference measuring information of a CSI process with M bits, wherein M1 bits are for the channel measuring information indicating one of the configured one or more NZP CSI-RSs for channel measurement, and M2 bits are for the interference measuring information indicating one of the configured one or more IMRs for interference measurement, the M1, the M2, and the M all being natural numbers, with M1+M2=M, and/or the index information indicates channel measuring information and interference measuring information of a CSI process with M bits, wherein M1 bits are for the channel measuring information indicating one of the configured one or more NZP CSI-RSs for channel measurement, M2 bits are for the interference measuring information indicating one of the configured one or more IMRs for interference measurement, and M3 bits are for the interference measuring information indicating one of the configured one or more interference measurement compensating NZP CSI-RSs for interference measurement compensation, the M1, the M2, the M3, and the M all being natural numbers, with M1+M2+M3=M.

13. The method according to claim 11, wherein the index information indicates channel measuring information and interference measuring information of a CSI process with M bits, wherein M1 bits are for the channel measuring information indicating one of the configured one or more NZP CSI-RSs for channel measurement, and M2 bits are for the interference measuring information indicating, with joint coding, one of the configured one or more IMRs for interference measurement and indicating one of the configured one or more interference measurement compensating NZP CSI-RSs for interference measurement compensation, the M1, the M2, and the M all being natural numbers, with M1+M2=M, and/or the index information is configured for: indicating the channel measuring information with 2 bits, indicating IMR information in the interference measuring information with 4 bits, and indicating interference measurement compensating information in the interference measuring information with 2 bits;

or, indicating the channel measuring information with 2 bits, indicating IMR) information in the interference measuring information with 3 bits, and indicating interference measurement compensating information in the interference measuring information with 2 bits;

or, indicating the channel measuring information with 2 bits, and indicating IMR information in the interference measuring information with 2 bits;

or, indicating the channel measuring information with 2 bits, indicating IMR information in the interference measuring information with 2 bits, and indicating interference measurement compensating information in the interference measuring information with 2 bits;

or, indicating the channel measuring information with 2 bits, indicating IMR) information in the interference measuring information with 1 bit, and indicating interference measurement compensating information in the interference measuring information with 1 bit;

or, indicating the channel measuring information with 2 bits, and indicating, with joint coding, IMR information and interference measurement compensating information in the interference measuring information with 2 bits.

14. A device for configuring Channel State Information (CSI) feedback, comprising:

a processor; and a memory storing instructions executable by the processor, wherein the processor is configured for: configuring, for a terminal, multiple CSI processes each comprising at least channel measuring information and interference measuring information, wherein the channel measuring information comprises one or more sets of nonzero-power (NZP) CSI Reference Signal (CSI-RS) configuring or indicating information; and the interference measuring information comprises at least one of:

one or more sets of interference measurement resource (IMR) configuring information or IMR indicating information; and one or more sets of interference measurement compensating NZP CSI-RS configuring information, wherein the processor is further configured for:

forming P CSI processes with one or more sets of channel measuring information and one or more sets of interference measuring information, and notifying, via a P-bit bitmap, the terminal to feed back Q of the P CSI processes, wherein the Q is a number of bits with a value of 1 in the P-bit bitmap or a number of bits with a value of 0 in the P-bit bitmap, both the P and the Q being natural numbers.

15. A measuring device based on Channel State Information (CSI) feedback configuring information, comprising a processor; and a memory storing instructions executable by the processor, wherein the processor is, configured for acquiring multiple CSI processes configured; and performing measurement in accordance with the multiple CSI processes;

wherein each of the multiple CSI processes comprises at least channel measuring information and interference measuring information; the channel measuring information comprises one or more sets of nonzero-power (NZP) CSI Reference Signal (CSI-RS) configuring or indicating information; and the interference measuring information comprises at least one of:

one or more sets of interference measurement resource (IMR) configuring information or IMR indicating information; and one or more sets of interference measurement compensating NZP CSI-RS configuring information, wherein P CSI processes are formed with one or more sets of channel measuring information and one or more sets of interference measuring information, and the device is notified, via a P-bit bitmap, to feed back Q of the P CSI processes, wherein the Q is a number of bits with a value of 1 in the P-bit bitmap or a number of bits with a value of 0 in the P-bit bitmap, both the P and the Q being natural numbers.

* * * * *